W. S. HARLEY.
REAR FORK CONSTRUCTION.
APPLICATION FILED OCT. 15, 1917.
1,262,786.
Patented Apr. 16, 1918.
3 SHEETS—SHEET 1.
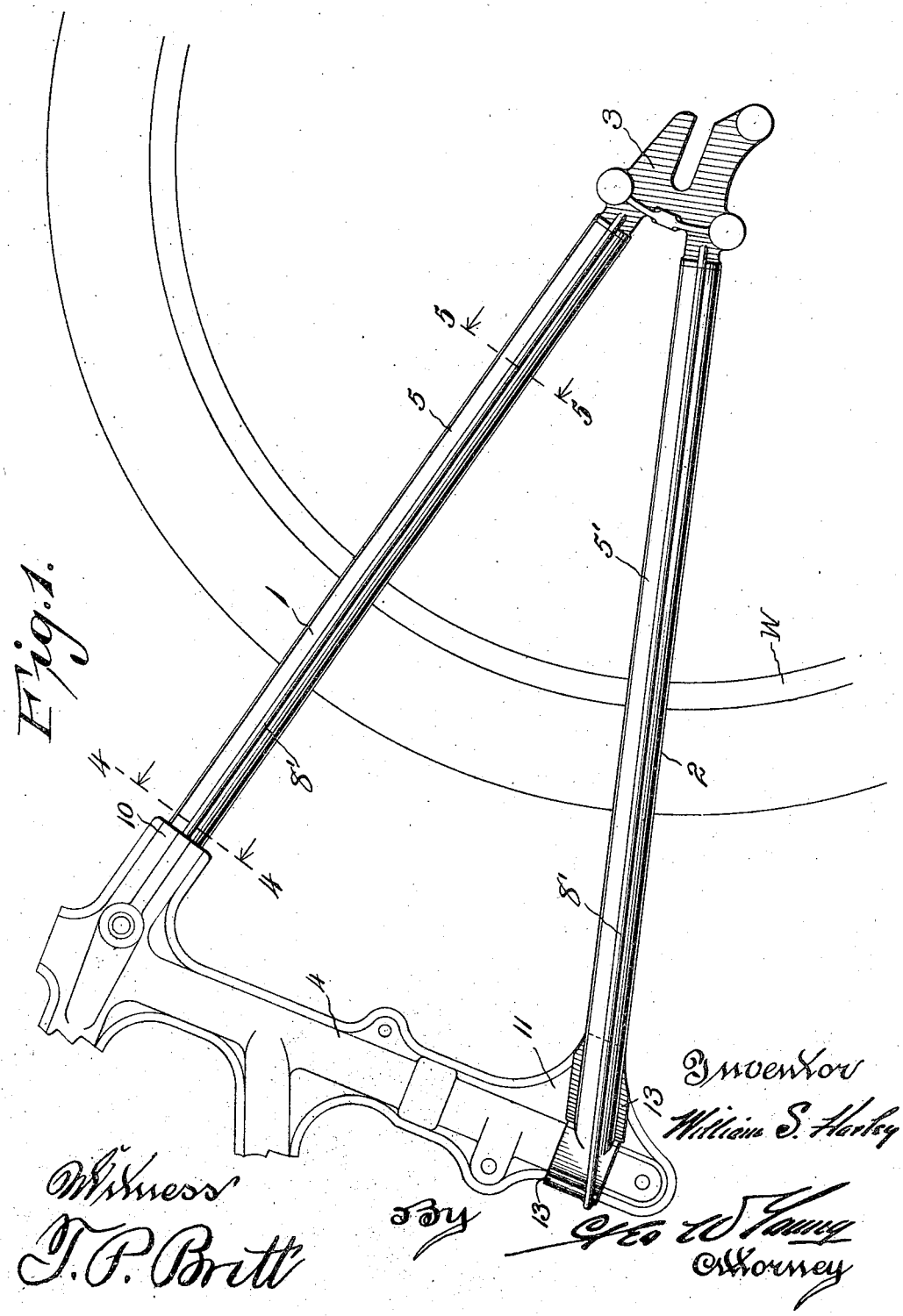

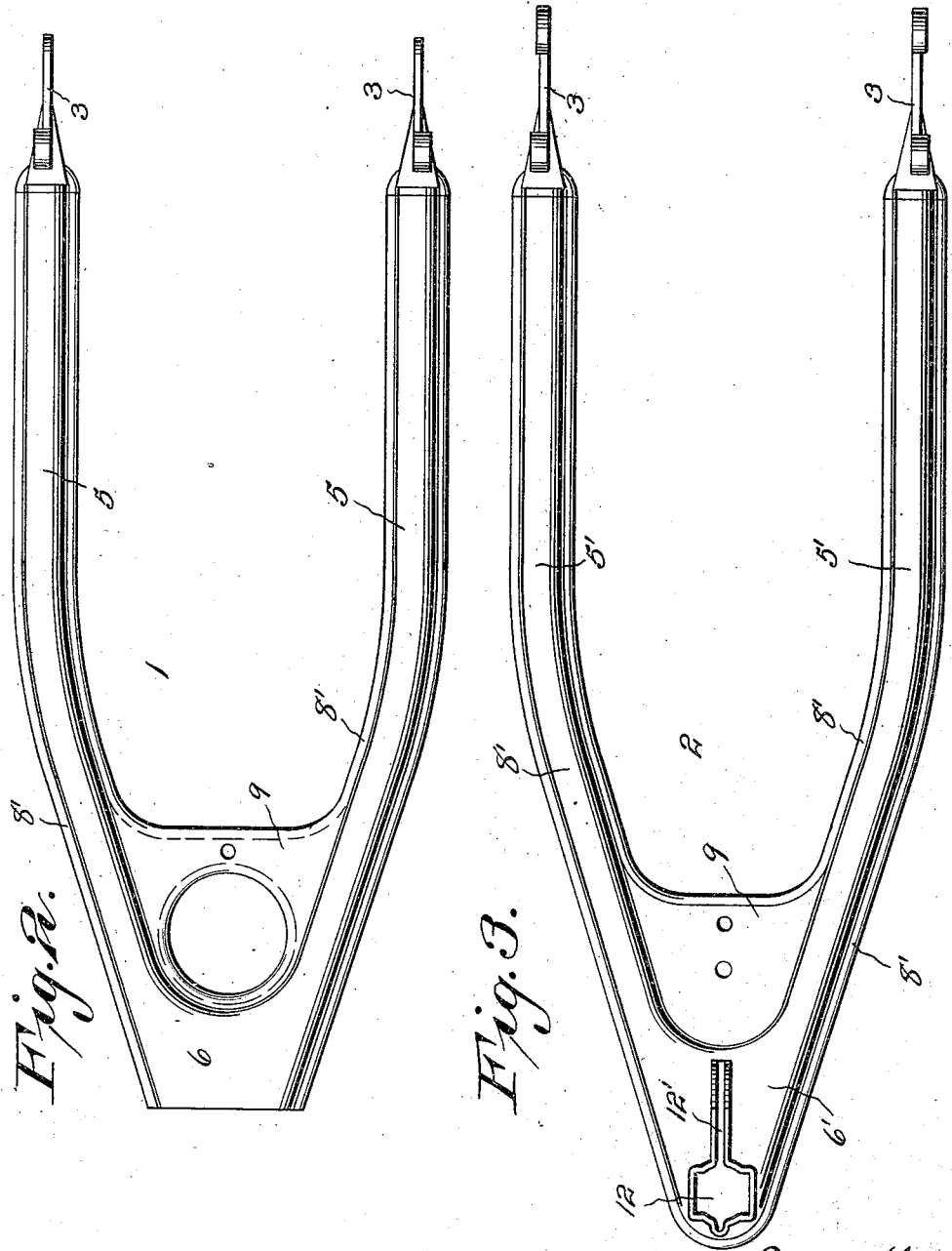

W. S. HARLEY.
REAR FORK CONSTRUCTION.
APPLICATION FILED OCT. 15, 1917.
1,262,786.
Patented Apr. 16, 1918.
3 SHEETS—SHEET 3.
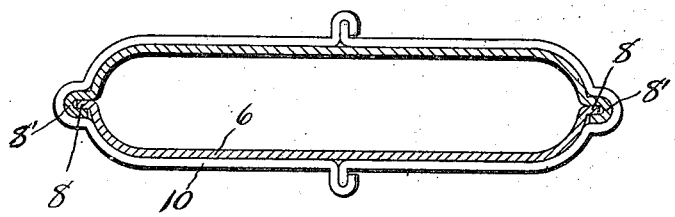
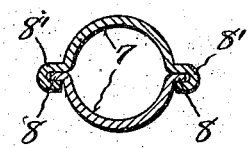
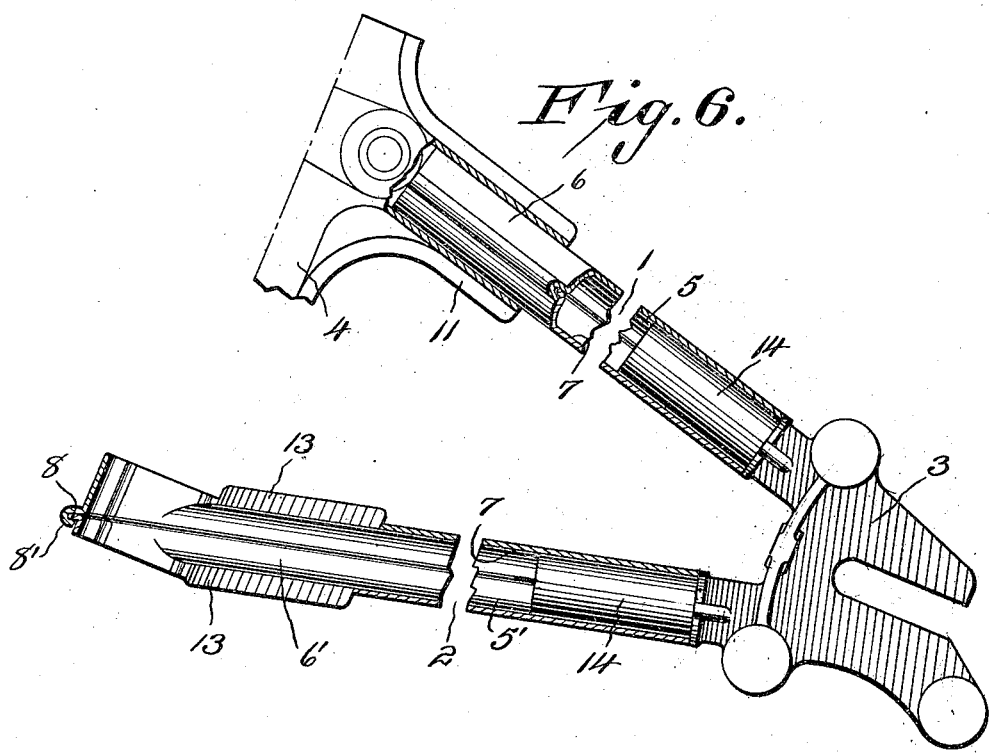

UNITED STATES PATENT OFFICE.

WILLIAM S. HARLEY, OF MILWAUKEE, WISCONSIN, ASSIGNOR TO HARLEY-DAVIDSON MOTOR CO., OF MILWAUKEE, WISCONSIN.

REAR-FORK CONSTRUCTION.

1,262,786.  Specification of Letters Patent.  Patented Apr. 16, 1918.

Application filed October 15, 1917. Serial No. 196,633.

*To all whom it may concern:*

Be it known that I, WILLIAM S. HARLEY, a citizen of the United States, and resident of Milwaukee, in the county of Milwaukee and State of Wisconsin, have invented certain new and useful Improvements in Rear-Fork Constructions; and I do hereby declare that the following is a full, clear, and exact description thereof.

This invention is similar to those illustrated and described in co-pending patent applications, Serial Nos. 196,630, and 196,632, all of these cases relating to the improvements in the manner of constructing motorcycle and bicycle frames, or frames of similar vehicles.

As set forth in these applications the principal object thereof is to provide a very light frame by stamping the same from light gage sheet metal.

The principal object of the present invention is to provide a sheet metal rear fork construction, which will be at least as strong as if such parts were formed of the usual tubing.

An additional object, which relates particularly to the present invention, is the means for readily and securely attaching the several parts forming the rear fork construction together and to the main part of the frame described and claimed in application, Serial No. 196,630.

With these and other objects in view, the invention consists in the novel features of construction, combination and arrangement of parts, which will be hereinafter more particularly described and claimed, and shown in the drawings, wherein:—

Figure 1 represents a side elevational view of a rear fork constructed in accordance with my invention.

Fig. 2 is a plane view of the upper fork member shown in Fig. 1.

Fig. 3 is a similar view of the lower fork member.

Fig. 4 is a transverse section on the lines 4—4 of Fig. 1.

Fig. 5 is a similar view on the line 5—5 of Fig. 1, and

Fig. 6 is a longitudinal sectional view through both the upper and lower members of the fork.

In the drawings the fork is shown constructed of an upper fork member 1, a lower fork member 2, and rear axle receiving plates 3, said parts being adapted to coöperate with a seat mast 4 forming a portion of the main frame of the vehicle. The upper fork member 1 is provided with a pair of tubes 5 which are disposed one on each side of a wheel W and have their upper ends merged into a head 6, their lower ends being attached to the axle receiving plates 3. The lower fork member is of similar construction, it having a pair of tubes 5′ merged into a head 6′ at their forward ends, their opposite ends being connected to said plates 3.

For forming each of the members 1 and 2 a pair of sheet metal plates is provided, these being substantially V-shaped so that after being stamped they will conform somewhat to the configuration of the parts shown in Figs. 2 and 3. The corresponding plates for each member 1 and 2 are so stamped that when said plates are disposed in engagement with each other the tubes 5 and 5′ will be substantially circular in cross section. In other words, each portion of the plates, which go to construct the tubes, has a substantially semi-circular channel stamped therein, as shown at 7 in Fig. 5. The edges of these channels are bent laterally to provide flanges 8 and 8′, the latter being considerably wider than the first mentioned flanges so that they may be bent upon themselves and into engagement with the first mentioned flanges 8, as illustrated in this figure. This forms an extremely efficient, yet very simple manner of connecting the plates to form the members and also provides longitudinally extending ribs which efficiently reinforce the members and prevent buckling.

As hereinbefore mentioned, the forward ends of the tubes 5 and 5′ merge into the heads 6, and 6′ this junction of the tubes being reinforced by webs 9 formed therebetween. In transverse section the heads are elongated and appear somewhat as shown in Fig. 4.

For connecting the members 1 and 2 to the seat mast, the upper end of the latter is provided with a transversely elongated flared socket 10, while the lower end of said mast has a rearwardly extending fin 11. The socket 10 receives the head 6 of the upper fork member, said head being snugly seated therein, as shown in Fig. 4, the opposite ends of the socket being extended outwardly to receive the ribs formed by the flanges 8 and 8'.

The connection between the lower end of the seat mast and the lower fork member is considerably different from the attachment of the upper member thereto, the head 6' being provided with an opening 12 shaped to conform to the size and shape of the lower end of the seat mast. One portion of this opening receives the tubular member of the mast, while the elongated portion 12' thereof is for the reception of the fin 11. The connection between these two parts is clearly shown in Fig. 1. The opening 12 is completely surrounded on both sides of the head by laterally extending flanges 13 whereby it is reinforced and held against enlargement due to excessive strains.

Inasmuch as the tubes of the upper and lower fork members are hollow, the plates 3 have cylindrical arms 14 formed thereon, which are adapted to extend into the free ends thereof, as shown in Fig. 6 where they are welded or brazed, or otherwise attached thereto. Each of the plates is provided with a pair of said arms to which they are integrally united.

Such an arrangement produces an extremely simply constructed and obviously light frame-work for the rear fork of motorcycle frames. Furthermore, because of the judicious disposition of the bracing ribs and the formation of the connections between the several parts of the invention, an extremely strong arrangement has been provided.

I claim:—

1. In a frame construction of the class described, a seat-mast having a transversely elongated flared socket formed adjacent one end, the opposite side walls of said socket each having a longitudinal channel, a fork member formed of a pair of arms having their forward ends merged into a head, and longitudinal ribs on the opposite sides of said head, said head being disposed in said socket, the ribs thereon engaging in said channels.

2. The combination with a seat mast having a socket formed adjacent one end, of a fork member formed of a pair of arms having their forward ends merged into a head, said head being disposed in said socket, a second fork member having one end secured to said seat mast, the other end being attached to the arms of the first mentioned fork member.

3. The combination with a seat mast, of a fork member having one end secured to the seat mast adjacent one of its ends, a second fork member having an opening formed transversely therethrough adjacent one end, said opening receiving the other end of said seat mast, and means for connecting the other ends of the fork members.

4. The combination with a seat mast having a laterally projecting fin, of a fork member secured at one end to the seat mast, a second fork member having an opening formed transversely therethrough, one portion of the opening being elongated to receive said fin, the other portion receiving the main part of the seat mast, and means for connecting the other ends of the fork members.

5. The combination with a seat mast, of an upper fork member having one end attached to said seat mast, a second fork member secured at one end to said seat mast, the opposite ends of said fork members being tubular, and a connecting plate having a pair of arms, said arms being disposed one in each of said tubular portions of the fork members.

6. In a frame construction of the class described, a seat-mast, and a fork member formed of a pair of arms merged together at one end, said fork member having an opening formed transversely therethrough at the intersection of said arms, said opening receiving one end of said seat-mast whereby to connect the fork member thereto.

7. In a frame construction of the class described, a seat-mast, a fork member formed of a pair of arms having their forward ends merged together, said fork member having an opening formed transversely therethrough adjacent the intersection of the arms, and laterally extending flanges surrounding said opening, said opening receiving the end of said seat-mast, said flanges being in engagement with the wall of said seat-mast whereby to reinforce the engagement between the same and said fork member.

In testimony that I claim the foregoing I have hereunto set my hand at Milwaukee, in the county of Milwaukee and State of Wisconsin.

WILLIAM S. HARLEY.